(12) United States Patent
Payette et al.

(10) Patent No.: US 7,478,853 B1
(45) Date of Patent: Jan. 20, 2009

(54) EXTENDED GRIP ADAPTED TO RETRIEVE POTTED PLANT

(76) Inventors: Joseph M. Payette, Sooke (CA); Lisa Payette, Sooke (CA)

( * ) Notice: Subject to any disclaimer, the term of this patent is extended or adjusted under 35 U.S.C. 154(b) by 0 days.

(21) Appl. No.: 11/725,494

(22) Filed: Mar. 19, 2007

(51) Int. Cl.
*B25J 1/02* (2006.01)
*B65G 7/12* (2006.01)

(52) U.S. Cl. ............................ 294/118; 294/16; 294/25
(58) Field of Classification Search ................ 294/118, 294/25, 16, 50.8, 57, 58; 16/430
See application file for complete search history.

(56) References Cited

U.S. PATENT DOCUMENTS

| | | | |
|---|---|---|---|
| 3,415,563 A * | 12/1968 | Millington | 294/25 |
| 3,809,421 A * | 5/1974 | James | 294/50.8 |
| 4,005,893 A | 2/1977 | Tash | |
| 4,042,270 A * | 8/1977 | Weiland | 294/50.8 |
| 4,929,010 A * | 5/1990 | Lahti | 294/16 |
| 5,114,199 A * | 5/1992 | Newcomer | 294/50.8 |
| 5,156,429 A * | 10/1992 | Adams | 294/25 |
| 5,435,611 A * | 7/1995 | Campbell et al. | 294/16 |
| 5,871,244 A | 2/1999 | Langford | |
| 5,890,259 A * | 4/1999 | Sarac | 16/422 |
| 6,119,393 A | 9/2000 | Wourms | |
| 6,276,732 B1 * | 8/2001 | Hauss | 294/16 |
| 6,494,513 B2 | 12/2002 | Worthington | |

* cited by examiner

*Primary Examiner*—Dean J Kramer

(57) ABSTRACT

A tong unit is used to grasp plants located in a pond. The tong unit includes two crossed arms each of which has an arcuate plant pot engaging portion on a distal end, a hand grip near a proximal end, an forearm rest near the hand grip and an elbow pad on the distal end. The crossed arms are manipulated in the manner of tongs to grasp and release curved plant pots.

1 Claim, 1 Drawing Sheet

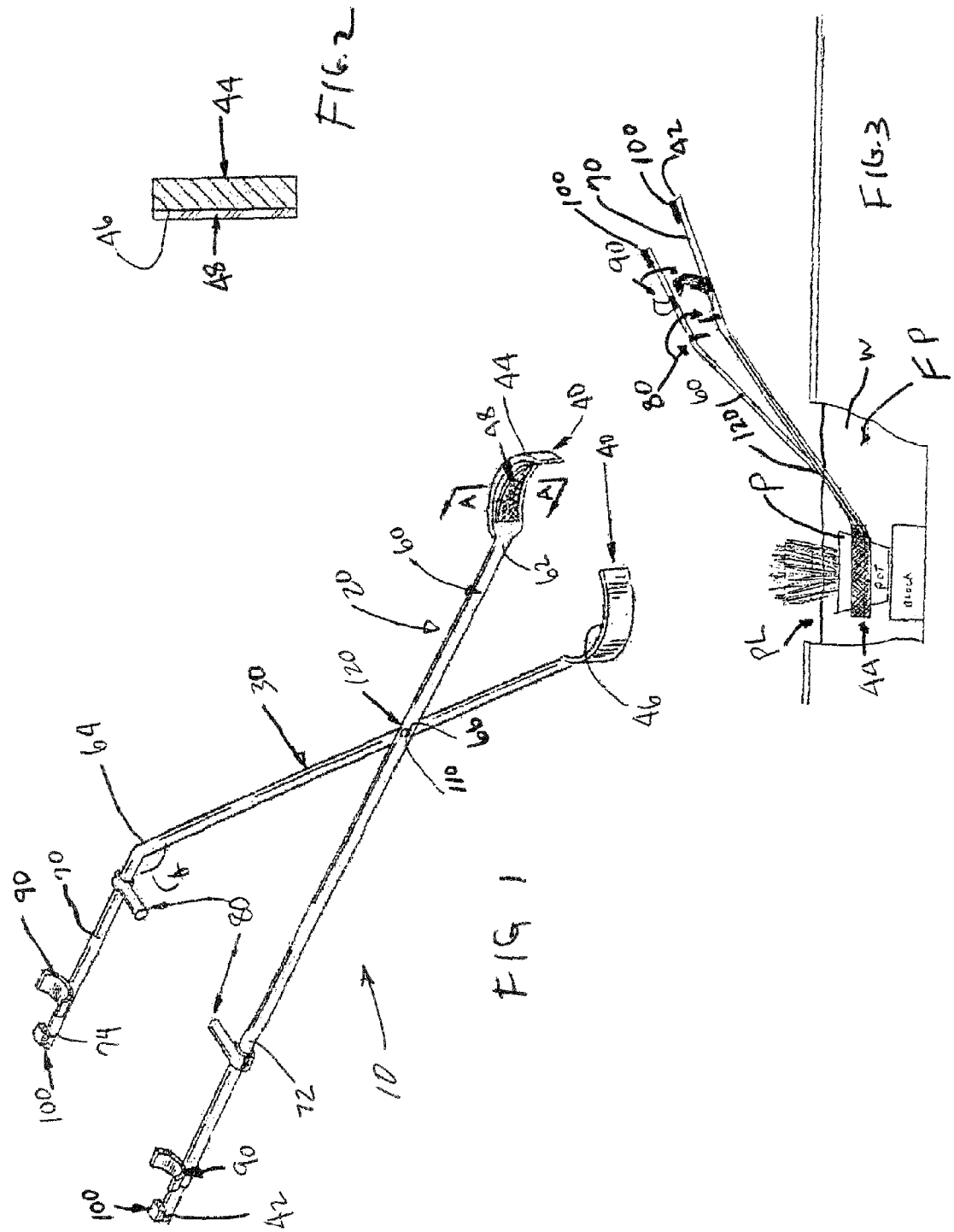

EXTENDED GRIP ADAPTED TO RETRIEVE POTTED PLANT

TECHNICAL FIELD OF THE INVENTION

The present invention relates to the general art of handles, and to the particular field of reach extenders.

BACKGROUND OF THE INVENTION

Conventional water ponds and water gardens are made by digging a hole into the ground to a depth of approximately 18 to 24 inches to accommodate various plants and in some cases approximately 36 inches to accommodate ornamental fish. In some pond installations, one or more shelves are formed in the side wall of the excavation for supporting particular types of water plants which are planted in pots, and then the excavation is lined with a flexible protective liner of rubber or other suitable material. Various varieties of plants contained in pots are placed on the bottom of the pond and on the shelf. The shelf which supports the potted plants are typically 10" to 12" deep and 10" to 12" wide and are sometimes angled slightly rearward and downward from the front edge to prevent the pots from sliding off into the pond.

In other pond installations, the excavation does not include the shelf formed in the side wall, and a rigid plastic or rubber tub is placed into the excavation. While some types of plants contained in pots may be placed on the bottom of the tub, it is necessary to support those that require a more shallow depth by any means at hand. Commonly, bricks, boards, cinder blocks, or milk crates are placed on the bottom of the tub and may be stacked to achieve the recommended depth.

Common type of plants used in water ponds and water gardens include deep water plants and marginal plants or bog plants. Deep water plants such as lilies are recommended to be placed 8 to 16 inches below the water. These types of plants grow from a tuber and form an elongate plant that extends well above the water surface. It is recommended that tropical lilies be planted 12 to 16 inches below the water. Bog plants such as cattails, horsetails, and rushes live in the shallows of the pond and their pots are placed on the shelves 8 to 16 inches below the water or supported on stacked bricks, boards, cinder blocks, or milk crates to achieve the recommended depth. These type of plants may grow anywhere from a foot to about 8 feet and thus also extend well above the water surface.

When water plants are planted in the pots, the soil stops about 2 inches from the top of the pot and the top of the soil is covered with an approximately 1" layer of stones and/or gravel to prevent the soil from floating and to prevent fish from digging into the soil.

Because these upper portions of these types of water plants extend well above surface of the water and the pots in which they are planted are a relatively shallow distance below the water surface, they frequently will blow over or slide off the support shelf or supporting bricks, boards, cinder blocks, or milk crates. This also causes the stones and gravel to spill into the pond and allows the potting soil to become dislodged and float in the water. Thus, the caretaker must often wade into the water to place the plants back into the upright position, and to retrieve the stones and gravel. Sometimes it is necessary to repot the plant.

The water plants must also be removed from the pond in order to clean the liner or tub periodically. Because the conventional pot containers do not have a handle or bail, the caretaker must wade into the water and grasp the pot to remove the plants.

Moving such plants is difficult and cumbersome to nearly anyone, but is especially difficult for a person with limited mobility or with a bad back.

Therefore, there is a need for a means to move such plants in an efficient and easy manner.

SUMMARY OF THE INVENTION

The above-discussed disadvantages of the prior art are overcome by a tong unit which is used to grasp plants located in a pond. The tong unit includes two crossed arms each of which has an arcuate plant pot engaging portion on a distal end, a hand grip near a proximal end, an forearm rest near the hand grip and an elbow pad on the distal end. The crossed arms are manipulated in the manner of tongs to grasp and release curved plant pots.

Using the tong unit embodying the present invention will permit a user to move potted plants in a fish pond without bending over or moving into the water. This is helpful to anyone, but is especially helpful for a person having limited mobility.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a tong unit embodying the present invention.

FIG. 2 is a sectional view taken along line A-A of FIG. 1.

FIG. 3 illustrates the tong unit in use.

DETAILED DESCRIPTION OF THE INVENTION

Referring to the figures, it can be understood that the present invention is embodied in a tong unit 10 which will enable a user to manipulate pots P for plants PL located in a pond FP in water W while the user stands on the side S of the pond as indicated in FIG. 3.

Tong unit 10 comprises two identical tong arms 20 and 30. Each tong arm includes a first end 40 which is a distal end when the arm is in use and a second end 42 which is a proximal end when the arm is in use. Each arm further includes a first section 44 which is located adjacent to the distal end. The first section is arcuate and has a concave surface 46 that is an inner surface when the arm is in use. A rubberlike friction material 48 is located on the inner surface of the first section.

Each arm further include a second section 60 which is linear and has one end 62 that is one-piece with the first section, a second end 64 and a pivot pin accommodating hole 66 defined therein. Each arm further includes a third section 70 which is linear and has one end 72 that is one-piece with the second section. The third section of each arm defines an oblique angle θ with the second section and has a second end 74 which is the proximal end of the arm.

Each arm further includes a hand grip element 80 mounted on the third section, an arcuate forearm rest 90 mounted on the third section between the hand grip element and the proximal end, and an elbow pad 100 mounted on the third section closely adjacent to the proximal end.

A pivot pin 10 is accommodated in the pivot pin accommodating hole on each tong arm and forms a pivot connection 120 pivotally connecting the two tong arms together.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A tong unit comprising:
    A) two identical tong arms, each tong arm including
    (1) a first end which is a distal end when the arm is in use,
    (2) a second end which is a proximal end when the arm is in use,
    (3) a first section adjacent to the distal end, the first section being arcuate and having a concave surface that is an inner surface when the arm is in use,
    (4) a rubberlike friction material on the inner surface of the first section,
    (5) a second section which is linear and has one end that is one-piece with the first section, a second end and a pivot pin accommodating hole defined therein,
    (6) a third section which is linear and has one end that is one-piece with the second section, the third section defining an oblique angle with the second section and having a second end which is the proximal end of the arm,
    (7) a hand grip element mounted on the third section,
    (8) an arcuate forearm rest mounted on the third section between the hand grip element and the proximal end, and
    (9) an elbow pad mounted on the third section closely adjacent to the proximal end; and
    B) a pivot pin accommodated in the pivot pin accommodating hole on each tong arm and pivotally connecting the two tong arms together.

* * * * *